United States Patent
Mennig et al.

(10) Patent No.: US 10,082,716 B2
(45) Date of Patent: Sep. 25, 2018

(54) COMPOSITE PANEL WITH ELECTRICALLY SWITCHABLE OPTICAL PROPERTIES

(71) Applicant: SAINT-GOBAIN GLASS FRANCE, Courbevoie (FR)

(72) Inventors: Julius Mennig, Compiegne (FR); Franz Penners, Heinsberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/418,898

(22) PCT Filed: Jun. 28, 2013

(86) PCT No.: PCT/EP2013/063629
§ 371 (c)(1),
(2) Date: Jan. 30, 2015

(87) PCT Pub. No.: WO2014/029536
PCT Pub. Date: Feb. 27, 2014

(65) Prior Publication Data
US 2015/0331296 A1    Nov. 19, 2015

(30) Foreign Application Priority Data

Aug. 21, 2012  (EP) .................................... 12181122

(51) Int. Cl.
*G02F 1/17* (2006.01)
*G02B 5/20* (2006.01)
(Continued)

(52) U.S. Cl.
CPC .......... *G02F 1/172* (2013.01); *B32B 17/1022* (2013.01); *B32B 17/10036* (2013.01);
(Continued)

(58) Field of Classification Search
CPC ................. G02B 5/281; B32B 17/10–17/1099
See application file for complete search history.

(56) References Cited

U.S. PATENT DOCUMENTS

| 4,578,526 A | 3/1986 | Nakano et al. |
| 4,799,745 A | 1/1989 | Meyer et al. |

(Continued)

FOREIGN PATENT DOCUMENTS

| CN | 1526085 A | 9/2004 |
| CN | 101415550 A | 4/2009 |

(Continued)

OTHER PUBLICATIONS

PCT International Search Report dated Aug. 21, 2012 for PCT/EP2013/063629 filed internationally on Jun. 28, 2013 in the name of Saint-Gobain Glass France.

(Continued)

*Primary Examiner* — Bumsuk Won
*Assistant Examiner* — Jeffrey Madonna
(74) *Attorney, Agent, or Firm* — Steinfl + Bruno LLP (57) ABSTRACT

A composite panel with electrically switchable optical properties, having: an outer panel and an inner panel which are connected to one another over the entire length thereof via an interlayer; within the interlayer, a switchable functional element with at least one active layer; and an infrared protective coating arranged between the outer panel and the active layer over the entire length thereof, wherein the infrared protective coating contains at least three functional layers with reflecting properties for the infrared range.

16 Claims, 6 Drawing Sheets

(51) Int. Cl.
*B32B 37/12* (2006.01)
*B32B 37/18* (2006.01)
*B32B 17/10* (2006.01)

(52) U.S. Cl.
CPC .. *B32B 17/10174* (2013.01); *B32B 17/10229* (2013.01); *B32B 17/10467* (2013.01); *B32B 17/10532* (2013.01); *B32B 37/12* (2013.01); *B32B 37/18* (2013.01); *G02B 5/208* (2013.01); *B32B 17/10504* (2013.01); *B32B 2307/412* (2013.01); *B32B 2307/71* (2013.01); *B32B 2398/20* (2013.01)

(56) References Cited

U.S. PATENT DOCUMENTS

| | | | |
|---|---|---|---|
| 5,408,353 A * | 4/1995 | Nichols | B32B 17/10036 359/260 |
| 6,034,813 A * | 3/2000 | Woodard | B32B 17/10 359/360 |
| 6,055,088 A | 4/2000 | Fix | |
| 6,056,861 A | 5/2000 | Fuhr | |
| 6,277,523 B1 | 8/2001 | Giron | |
| 6,582,809 B2 | 6/2003 | Boire et al. | |
| 7,486,342 B2 | 2/2009 | Mathey et al. | |
| 9,557,595 B2 * | 1/2017 | Brecht | B32B 17/10036 |
| 2002/0064662 A1 * | 5/2002 | Lingle | B32B 17/10009 428/432 |
| 2003/0160260 A1 | 8/2003 | Hirai et al. | |
| 2004/0067343 A1 | 4/2004 | Beteille et al. | |
| 2004/0227462 A1 | 11/2004 | Utsumi | |
| 2004/0257649 A1 | 12/2004 | Heikkila | |
| 2005/0227061 A1 | 10/2005 | Slovak | |
| 2006/0061255 A1 | 3/2006 | Mizuta et al. | |
| 2009/0115922 A1 | 5/2009 | Veerasamy | |
| 2009/0176101 A1 | 7/2009 | Greenall et al. | |
| 2009/0181203 A1 | 7/2009 | Valentin et al. | |
| 2009/0219468 A1 | 9/2009 | Barton | |
| 2009/0323162 A1 | 12/2009 | Fanton et al. | |
| 2011/0018563 A1 | 1/2011 | Reese | |
| 2011/0170170 A1 * | 7/2011 | Boote | B32B 17/10174 359/296 |
| 2011/0171443 A1 * | 7/2011 | Thompson | B32B 17/10036 428/212 |
| 2012/0013969 A1 | 1/2012 | Wang et al. | |
| 2012/0026573 A1 | 2/2012 | Collins | |
| 2012/0176656 A1 * | 7/2012 | Boote | B32B 17/10 359/240 |
| 2012/0307337 A1 | 12/2012 | Bartug et al. | |
| 2013/0229612 A1 | 9/2013 | Gayout et al. | |
| 2015/0098037 A1 | 4/2015 | Gayout et al. | |
| 2015/0298431 A1 | 10/2015 | Von Der Weiden et al. | |

FOREIGN PATENT DOCUMENTS

| | | |
|---|---|---|
| CN | 102350833 A | 2/2012 |
| DE | 102008026339 | 12/2009 |
| EP | 0876608 | 11/1998 |
| EP | 1862849 | 12/2007 |
| EP | 2010385 | 1/2009 |
| EP | 2013013 | 1/2009 |
| JP | H04-504555 A | 8/1992 |
| JP | H05-165011 A | 6/1993 |
| JP | H10-217378 A | 8/1998 |
| JP | 2901676 B2 | 6/1999 |
| JP | 2008025229 | 2/2008 |
| JP | 2008-249770 A | 10/2008 |
| JP | 2009-533248 A | 9/2009 |
| JP | 2009-534283 A | 9/2009 |
| JP | 2010-536707 A | 12/2010 |
| KR | 10-2005-0121706 A | 12/2005 |
| WO | 2009061329 | 5/2005 |
| WO | 2007122426 | 11/2007 |
| WO | 2009153593 | 12/2009 |
| WO | 2010032068 | 3/2010 |
| WO | 2010112789 | 10/2010 |
| WO | 2010147494 | 12/2010 |
| WO | 2011033313 | 3/2011 |
| WO | 2012007334 | 1/2012 |
| WO | 2012028823 A1 | 3/2012 |
| WO | 2012154663 | 11/2012 |

OTHER PUBLICATIONS

Kempe M et al: "Evaluation and modeling of edge-seal materials for photovoltaic applications", 35th IEEE Photovoltaic Specialists Conference (PVSC), Jun. 20-25, 2010.

International Search Report, dated Sep. 27, 2013, for PCT application PCT/EP2013/063629, filed on Jun. 28, 2013, in the name of Saint-Gobain Glass France (English translation and German original).

Written Opinion, dated Sep. 27, 2013 (PCT/ISA/210), for PCT application PCT/EP2013/063629, filed on Jun. 28, 2013, in the name of Saint-Gobain Glass France (English translation and German original).

International Search Report, dated Aug. 26, 2013, for PCT application PCT/EP2013/063628, filed on Jun. 28, 2013, in the name of Saint-Gobain Glass France (English translation and German original).

Written Opinion, dated Aug. 26, 2013 (PCT/ISA/210), for PCT application PCT/EP2013/063628, filed on Jun. 28, 2013, in the name of Saint-Gobain Glass France (English translation and German original).

McMaster-Carr (Super-Touch Surface-Protection Tape Part # 3402A14), accessed Mar. 14, 2016. 1 page.

Restriction Requirement for U.S. Appl. No. 14/417,788, filed Jan. 27, 2015 on behalf of Saint-Gobain Glass France. dated Dec. 9, 2015. 9 pages.

Non-Final Office Action for U.S. Appl. No. 14/417,788, filed Jan. 27, 2015 on behalf of Saint-Gobain Glass France. dated Mar. 21, 2016. 20 pages.

Final Office Action for U.S. Appl. No. 14/417,788, filed Jan. 27, 2015 on behalf of Saint-Gobain Glass France. dated Dec. 30, 2016. 20 pages.

3M Riveters Tape 695 (http://multimedia.3m.com/mws/media/666850/riveters-tape-695.pdf) accessed Aug. 29, 2017; 2 pages; Aug. 2015.

Advisory Action for U.S. Appl. No. 14/417,788, filed Jan. 27, 2015 on behalf of Ingo Von Der Weiden. dated May 23, 2017. 4 pages.

Non-Final Office Action U.S. Appl. No. 14/417,788, filed Jan. 27, 2015 on behalf of Ingo Von Der Weiden. dated Sep. 6, 2017. 15 pages.

Final Office Action issued for U.S. Appl. No. 14/417,788, filed Jan. 27, 2015 on behalf of Saint-Gobain Glass France. dated Feb. 6, 2018. 16 pages.

* cited by examiner

COMPOSITE PANEL WITH ELECTRICALLY SWITCHABLE OPTICAL PROPERTIES

CROSS REFERENCE TO RELATED APPLICATIONS

The present application is the US national stage of International Patent Application PCT/EP2013/063629 filed internationally on Jun. 28, 2013 which, in turn, claims priority to European Patent Application No. 12181122.8 filed on Aug. 21, 2012.

The invention relates to a composite pane with electrically switchable optical properties, a method for its production, and the use of an infrared protective coating in such a composite pane.

Glazings with electrically switchable functional elements are known. The optical properties of the functional elements can be modified by an applied voltage. Electrochromic functional elements, known, for example, from US 20120026573 A1 and WO 2012007334 A1, are an example of this. SPD functional elements (suspended particle device), known, for example, from EP 0876608 B1 and WO 2011033313 A1, are another example. The transmittance of visible light through electrochromic or SPD functional elements can be controlled by the voltage applied. Glazings with such functional elements can thus be conveniently darkened electrically.

Many switchable functional elements have limited long-term stability. This is true in particular for functional elements in glazings outdoors, for example, in building façades or in the motor vehicle sector, where the functional elements are exposed to sunlight. In particular, the infrared spectral component of sunlight results in aging of the functional elements. The aging can, for example, manifest itself in unesthetic discoloration of the functional elements, which can be homogeneous or even inhomogeneous. The aging can, however, also result in degradation of the functionality of the switchable functional element, in particular in a reduced contrast between the switching states.

Consequently, WO 2007122426 A1 proposes protecting the functional element within a composite pane by a protective coating against infrared radiation. The protective coating preferably contains one or two functional silver layers, by means of which infrared radiation is reflected. However, protective coatings with one or two silver layers have high transmittance in the near infrared range. Consequently, damage to the functional element can certainly be reduced by such a protective coating, but cannot be completely prevented.

The object of the present invention is to provide a composite pane with electrically switchable optical properties which has improved protection of the switchable functional element against infrared radiation.

The object of the present invention is accomplished according to the invention by a composite pane with electrically switchable optical properties according to independent claim 1. Preferred embodiments emerge from the dependent claims.

The composite pane according to the invention with electrically switchable optical properties comprises at least the following characteristics:
  an outer pane and an inner pane, which are laminarily bonded to one another via an intermediate layer,
  inside the intermediate layer, a switchable functional element with at least one active layer, and
  an infrared protective coating arranged laminarily between the outer pane and the active layer,
wherein the infrared protective coating includes at least three functional layers with reflecting properties for the infrared range.

The composite pane according to the invention is preferably provided in an opening, for example, of a motor vehicle or of a building, to separate the interior from the external environment. In the context of the invention, "outer pane" refers to that pane that, in its installed position, faces the external environment. "Inner pane" means that pane that, in the installed position, faces the interior. In principle, the composite pane according to the invention can, of course, also be used in the interior of a building, in particular when protection against infrared radiation is required there. The outer pane is then that pane that faces the infrared radiation source.

If an element includes at least one material, this includes, in the context of the invention, the case that the element is made of the material.

In context of the invention, "a composite pane with electrically switchable optical properties" refers not only to a composite pane whose optical properties, for example, the transmittance of visible light can be switched between two discrete states for example an opaque and a transparent state. It also refers to composite panes whose optical properties are continuously variable.

According to the invention, the infrared protective coating is arranged laminarily between the outer pane and the active layer. Sunlight entering from the external environment through the composite pane thus strikes the infrared protective coating first and then the functional element. The infrared radiation component of sunlight is reflected and/or absorbed by the infrared protective coating and, consequently, does not strike the functional element (or does so only to a significantly reduced extent). The major advantage of the invention lies in the infrared protective coating with at least three functional layers implemented according to the invention. Such an infrared protective coating has high transmittance in the visible spectral range, but has high reflectance already in the near infrared range adjacent the visible spectral range. The functional element is particularly effectively protected against infrared radiation components by the infrared protective coating according to the invention, without the transparency of the composite pane being disruptively diminished in the visible spectral range. By means of the arrangement between an active layer and an outer pane, the infrared protective coating is advantageously protected in the interior of the composite pane against damage and corrosion.

Of course, the composite pane can also have more than one infrared protective coating according to the invention. According to the invention, at least one infrared protective coating must be arranged between the active layer of the functional element and the outer pane. For example, another infrared protective coating can be arranged between the active layer and the inner pane.

The electrically switchable functional element comprises at least one active layer, which has the switchable optical properties. The active layer is arranged laminarily between an outer and an inner transparent plate electrode. The outer plate electrode faces the outer pane and the inner plate electrode faces the inner pane. The plate electrodes and the active layer are typically arranged parallel to the surfaces of the outer pane and the inner pane. The plate electrodes are electrically connected to an external voltage source in a manner known per se. The electrical contact is realized by means of suitable connection cables, for example, foil conductors, which are optionally connected to the plate electrodes via so-called bus bars, for example, strips of an electrically conductive material or electrically conductive imprints.

The switchable functional element is embedded in the intermediate layer of the composite pane according to the invention. The outer pane and the inner pane are durably stably bonded to one another by lamination via the intermediate layer. The intermediate layer includes at least one thermoplastic adhesive film. The thermoplastic adhesive film includes at least one thermoplastic polymer, preferably ethylene vinyl acetate (EVA) and/or polyvinyl butyral (PVB). Thus, a particularly advantageous bonding of the intermediate layer to the outer pane and to the inner pane is achieved. However, the thermoplastic adhesive film can also include, for example, at least polyurethane, polyethylene, polyethylene terephthalate, polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene tetrafluoroethylene. The thickness of the thermoplastic adhesive film is preferably from 0.25 mm to 1 mm, for example, 0.38 mm or 0.76 mm.

In principle, the functional element can, for example, be applied on the inside surface of the outer pane or of the inner pane. The "inside surface" refers to that surface of a pane that faces the intermediate layer. In a preferred embodiment, the functional element is arranged laminarily between at least two thermoplastic adhesive films. The functional element is bonded to the outer pane via at least one first thermoplastic adhesive film and to the inner pane via at least one second thermoplastic adhesive film. The first and the second thermoplastic adhesive films are in contact with the outer pane or the inner pane respectively and effect the bonding of the functional element to the outer pane and the inner pane to form the composite pane.

In a preferred embodiment, the functional element is provided during the production of the composite pane as a pre-laminated film-functional element. In the case of such a pre-laminated functional element, the actual functional element is arranged laminarily between at least one first and at least one second carrier film. The first carrier film is preferably bonded to the outer pane at least via one first thermoplastic adhesive film and the second carrier film is bonded to the inner pane via at least one second thermoplastic adhesive film. The intermediate layer then comprises, with increasing distance from the outer pane, at least the first thermoplastic adhesive film, the first carrier film, the outer plate electrode, the active layer, the inner plate electrode, the second carrier film, and the second thermoplastic adhesive film. The advantage resides in simple production of the composite pane. The pre-laminated functional element can, during production, simply be inserted in the composite, which is then laminated using the prior art methods to form the composite pane. The functional element is advantageously protected against damage, in particular corrosion, by the carrier film and can even be prepared in relatively large quantities, before the production of the composite pane, which can be desirable for economical and process engineering reasons.

The carrier films preferably contain at least one thermoplastic polymer, particularly preferably polyethylene terephthalate (PET). This is particularly advantageous with regard to the stability of the pre-laminated functional element. However, the carrier films can also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene-propylenes, polyvinyl fluoride, and/or ethylene-tetrafluoroethylene. The thickness of each carrier film is preferably from 0.1 mm to 1 mm, particularly preferably from 0.1 mm to 0.2 mm. The total thickness of the composite pane is increased only insignificantly by a carrier film with such a low thickness.

In a preferred embodiment of the invention, the infrared protective coating is applied on the inside surface of the outer pane. The particular advantage resides in simple and cost-effective production of the composite pane. Moreover, an infrared protective coating on the outer pane can be subjected in a simple manner to temperature treatment, by means of which, in particular, the transmittance of visible light through the pane is improved. The functional element includes an outer plate electrode and an inner plate electrode, between which the active layer is arranged congruently.

In other embodiments of the invention, the infrared protective coating is applied on a film of the intermediate layer. The film of the intermediate layer can be, for example, the first thermoplastic adhesive film, via which the functional element is bonded to the outer pane. The film of the intermediate layer can be, for example, the first carrier film of a pre-laminated functional element that faces the outer pane. In principle, another thermoplastic film, which is provided with the infrared protective coating, can also be inserted into the composite, preferably between the first thermoplastic adhesive film and the first carrier film. However, such a solution has the disadvantage of an increased thickness of the composite pane as well as the risk of unesthetic distortions inside the intermediate layer.

In a preferred embodiment of the invention, the infrared protective coating is applied on the first carrier film of a pre-laminated functional element. The functional element can then be prepared in a manner advantageous from the process engineering standpoint together with the infrared protective coating. In one embodiment, the infrared protective coating is arranged on the surface of the first carrier film facing away from the functional element and facing the first thermoplastic adhesive film. A previously prepared, possibly commercially acquired pre-laminated functional element can be provided with the infrared coating, before production of the composite pane. The functional element includes an outer plate electrode and an inner plate electrode, between which the active layer is arranged congruently. In another embodiment, the infrared protective coating is arranged on the surface of the carrier layer facing the functional element. The infrared protective coating is then advantageously already protected before production of the composite pane in the interior of the pre-laminated functional element against damage and corrosion. A further advantage consists in that the infrared protective coating can simultaneously function as a plate electrode, provided it has sufficient electrical conductivity.

In a particularly preferable embodiment of the invention, the infrared protective coating is applied on the surface of the first carrier film facing the active layer and the infrared protective coating is the outer plate electrode. The functional element includes the infrared protective coating as an outer plate electrode and an inner plate electrode, between which the active layer is arranged congruently. The infrared protective coating makes electrical contact preferably by means of at least one suitable cable and, optionally, a bus bar, and is connected to the external voltage source. The particular advantage resides in simpler production of the composite pane, when the infrared protective coating and the outer plate electrode are realized by the same element and do not have to be introduced into the composite pane as different elements.

The inventive concept of using the infrared protective coating as the outer plate electrode is absolutely not limited to infrared protective coatings with at least three functional layers. It can, for example, also be realized through infrared protective coatings with at least two functional layers with reflecting properties for the infrared range, for example, two or three functional layers.

The infrared protective coating can be applied over the entire surface of the outer pane or a film of the intermediate layer. Then, the area of the infrared protective coating corresponds to the area of the composite pane. However, the composite pane can also have an edge region, with a width of, for example, from 3 mm to 50 mm, that is not provided with the infrared protective coating. Then, the infrared protective coating has no contact with the outside atmosphere and is advantageously protected in the interior of the composite pane against corrosion.

The functional layers of the infrared protective coating according to the invention are preferably metal and contain at least one metal, for example, silver, gold, copper, nickel, and/or chromium, or a metal alloy. The functional layers most particularly preferably contain at least 90 wt.-% of the metal, in particular at least 99.9 wt.-% of the metal. The functional layers can be made of the metal or the metal alloy. The functional layers particularly preferably contain silver or a silver-containing alloy. Such functional layers have particularly advantageous reflectance in the infrared range with simultaneously high transmittance in the visible spectral range.

Each functional layer of the infrared protective coating according to the invention preferably has a thickness from 5 nm to 50 nm, particularly preferably from 8 nm to 25 nm, and most particularly preferably from 10 nm to 20 nm. In this range for the thickness of the functional layer, an advantageously high transmittance in the visible spectral range and a particularly advantageous level of reflectance in the infrared range are obtained.

The infrared protective coating according to the invention can include more than three functional layers, for example, four or five functional layers. Preferably, the infrared protective coating contains exactly three functional layers. Infrared protective coatings with three functional layers are simpler to produce than infrared coatings with more than three functional layers. It has been demonstrated that infrared protective coating with exactly three functional layers enable effective protection of the functional element against infrared radiation along with high transmittance in the visible spectral range.

In an advantageous embodiment, at least one dielectric layer is arranged in each case between two adjacent functional layers of the infrared protective coating. Two functional layers are considered adjacent if no additional functional layer is arranged therebetween. Preferably, another dielectric layer is arranged below the first functional layer. The first functional layer is the one of the at least three functional layers, which is the shortest distance from the surface on which the infrared protective coating is applied. A layer is arranged below another layer when it is a shorter distance from said surface than the other layer. Preferably, another dielectric layer is arranged above the last functional layer. The last functional layer is the one of the at least three functional layers that is the greatest distance from the surface on which the infrared protective coating is applied. A layer is arranged above another layer when it is a greater distance from said surface than the other layer.

The infrared protective coating thus comprises, in a particularly preferred embodiment, n functional layers and (n+1) dielectric layers, with the functional layers and the dielectric layers applied alternatingly such that each functional layer is arranged between two dielectric layers. Here, n is an integer. This is particularly advantageous with regard to the optical properties of the composite pane as well as the reflection properties in the infrared range. By means of the dielectric layers, the infrared protective coating can be provided, in particular, with antireflective properties in the visible spectral range, by which means the transmittance is improved.

Each dielectric layer contains at least a single layer made of a dielectric material. A dielectric layer can be made of a single layer of a dielectric material. The single layer made of dielectric material preferably contains at least one oxide (for example, tin oxide, zinc oxide, aluminum oxide, titanium oxide, silicon oxide, manganese oxide, tungsten oxide, or niobium oxide, or bismuth oxide) and/or at least one nitride (for example, silicon nitride, zirconium nitride, or aluminum nitride). The single layer made of a dielectric material particularly preferably contains silicon nitride. Thus, particularly good results with regard to the optical properties of the infrared protective coating are obtained. The single layer made of a dielectric material can also have dopants, for example, aluminum, zirconium, and/or boron.

Each single layer made of a dielectric material preferably has a thickness from 10 nm to 100 nm, particularly preferably from 20 nm to 70 nm. This is particularly advantageous with regard to the optical properties of the composite pane.

However, one or a plurality of the dielectric layers can also include more than one single layer. The dielectric layer can contain, for example, in addition to said single layer made of a dielectric material, at least one smoothing layer. The smoothing layer effects a smoothing of the surface of the layers applied above the smoothing layer. Thus, higher transmittance in the visible spectral range is obtained. The smoothing layer can, for example, contain a noncrystalline (i.e., amorphous or partially amorphous) oxide. Particularly suitable, are oxides of one or more of the elements tin, silicon, titanium, zirconium, hafnium, zinc, gallium, and indium, for example, mixed tin-zinc oxide. The smoothing layer can, for example, have a thickness from 3 nm to 20 nm. The dielectric layer can also contain, for example, in addition to said single layer made of a dielectric material, at least one matching layer, which contains, for example, zinc oxide, and has, for example, a thickness from 3 nm to 20 nm. The optical properties of the composite pane are further improved by matching layers.

In an advantageous embodiment, the infrared protective coating is tempered. For this, the infrared protective coating is subjected to a temperature treatment. The infrared protective coating is preferably heated to a temperature of at least 200° C., particularly preferably at least 300° C. Such a temperature treatment influences, in particular, the crystallinity, in particular, of the functional layer and results in improved transmittance in the visible spectral range. If the infrared protective coating is applied on the outer pane of a curved composite pane, the temperature treatment can occur within the bending process of the outer pane, which is typically carried out at elevated temperatures of, for example, 500° C. to 700° C.

The functional element can, in principle, be any electrically switchable functional element known per se to the person skilled in the art. The invention is, of course, advantageous in particular in conjunction with those functional elements that age under irradiation with infrared radiation.

In an advantageous embodiment of the invention, the active layer of the functional element is an electrochemically active layer. Such functional elements are known as electrochromic functional elements. The transmittance of visible light depends on the ion storage level in the active layer, with the ions being provided, for example, by an ion storage layer between the active layer and a plate electrode. The transmittance can be influenced by the voltage applied on the plate electrodes which triggers a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In an another advantageous embodiment of the invention, the active layer of the functional element contains liquid crystals that are embedded, for example, in a polymeric matrix. Such functional elements are known as PDLC functional elements (polymer dispersed liquid crystal). When no voltage is applied on the plate electrodes, the liquid crystals are randomly oriented which results in strong scattering of the light passing through the active layer. When a voltage is applied on the plate electrodes, the liquid crystals orient themselves in a common direction and the transmittance of light through the active layer is increased. Such a functional element is known, for example, from DE 102008026339 A1.

In an another advantageous embodiment of the invention, the functional element is an electroluminescent functional element. In this case, the active layer contains electroluminescent materials, which can be inorganic or organic (OLEDs). Through application of a voltage on the plate electrodes, the luminescence of the active layer is stimulated. Such functional elements are known, for example, from US 2004227462 A1 and WO 2010112789 A2.

In an another advantageous embodiment of the invention, the active layer of the functional element contains suspended particles, with the absorption of light by the active layer variable through the application of a voltage on the plate electrodes. Such functional elements are known as SPD functional elements (suspended particle device), for example, from EP 0876608 B1 and WO 2011033313 A1.

SPD functional elements are particularly preferred within the scope of the invention. Surprisingly, it has been demonstrated that SPD functional elements can be very particularly effectively protected against aging by an infrared protective coating according to the invention.

Of course, the functional element can have, besides the active layer and the plate electrodes, other layers known per se, for example, barrier layers, blocker layers, antireflection layers, protective layers, and/or smoothing layers.

The area of the functional element can equal the area of the composite pane. Then, an advantageous uniform darkening of the composite pane is obtained by means of the switchable functional element. The side edges of the composite pane are then preferably provided with suitable sealing in order to protect the functional element against corrosion. However, the composite pane can, alternatively, also have a circumferential edge region that is not provided with the functional element, in particular if this edge region is covered by fastening elements, frames, or imprints. The functional element is then advantageously protected against corrosion in the interior of the intermediate layer.

The inner and/or the outer plate electrode are preferably designed as transparent, electrically conductive layers. The plate electrodes preferably contain at least one metal, a metal alloy, or a transparent conducting oxide (TCO). The plate electrodes can, for example, contain silver, gold, copper, nickel, chromium, tungsten, indium tin oxide (ITO), gallium-doped or aluminum-doped zinc oxide, and/or fluorine-doped or antimony-doped tin oxide. The plate electrodes preferably have a thickness from 200 nm to 2 µm.

The outer pane and/or the inner pane preferably contain non-prestressed, partially prestressed, or prestressed glass, particularly preferably flat glass, float glass, quartz glass, borosilicate glass, soda lime glass, or clear plastics, particularly preferably rigid clear plastics, in particular polyethylene, polypropylene, polycarbonate, polymethyl methacrylate, polystyrene, polyamide, polyester, polyvinyl chloride, and/or mixtures thereof. The outer pane and/or the inner pane can be clear and transparent and have, for example, transmittance of at least 70% in the visible spectral range, preferably at least 85%. However, the outer pane and/or the inner pane can also be tinted or colored and have, for example, transmittance from 20% to 70% in the visible spectral range.

The thickness of the outer pane and of inner pane can vary widely and thus be adapted to the requirements in the individual case. The outer pane and/or the inner pane preferably have thicknesses from 0.5 mm to 15 mm, particularly preferably from 1 mm to 5 mm, and most particularly preferably from 1.5 mm to 3 mm, for example, 1.6 mm, 1.8 mm, or 2.1 mm.

The area of the composite pane according to the invention can vary widely, for example, from 100 $cm^2$ to 20 $m^2$. Preferably, the composite pane has an area from 400 $cm^2$ to 6 $m^2$, as customary for glazings of motor vehicles and structural and architectural glazings. The composite pane can have any three-dimensional shape. The composite pane is preferably planar or slightly or greatly curved in one or a plurality of spatial directions.

The outer pane, the inner pane, and/or the films of the intermediate layer can have other suitable coatings known per se, for example, antireflection coatings, nonstick coatings, scratch resistant coatings, photocatalytic coatings, or thermal radiation reflecting coatings (low-E coatings).

The transmittance of the infrared protective coating according to the invention in the visible spectral range from 400 nm to 750 nm is preferably greater than or equal to 65%, particularly preferably greater than or equal to 70% (in particular if the infrared protective coating is tempered).

The averaged transmittance of the infrared protective coating according to the invention in the infrared spectral range from 800 nm to 2000 nm is preferably less than or equal to 10%, particularly preferably less than or equal to 5%.

The averaged transmittance of the infrared protective coating according to the invention in the near-infrared range from 800 nm to 900 nm is preferably less than or equal to 15%, particularly preferably less than or equal to 10%, most particularly preferably less than or equal to 5%, and, in particular, less than or equal to 3%.

The transmittance of the infrared protective coating can be determined by measuring the transmittance of the substrate (for example, the outer pane or the coating film) provided with the protective coating and correcting it with the transmission of the non-coated substrate. The transmittance of the non-coated substrate can be measured on the same substrate before the coating or on an identically designed substrate.

The object of the invention is further accomplished by a method for producing a composite pane according to the invention with electrically switchable optical properties, wherein at least a) the infrared protective coating is applied on the inner surface of the outer pane or a surface of the first carrier film,
b) the intermediate layer with the switchable functional element is arranged laminarily between the outer pane and the inner pane, and
c) the outer pane is bonded to the inner pane via the intermediate layer.

In an advantageous embodiment, the infrared protective coating is heated after process step (a) to a temperature of at least 200° C., preferably at least 300° C., in order to improve the transmittance in the visible spectral range.

The application of the infrared protective coating is done by methods known per se, preferably by magnetic field assisted cathodic sputtering. This is particularly advantageous with regard to simple, fast, economical, and uniform coating of the substrate. The cathodic sputtering is done in a protective gas atmosphere, for example, of argon, or in a reactive gas atmosphere, for example, by addition of oxygen or nitrogen. However, the infrared protective coating can also be applied by other methods known to the person skilled in the art, for example, by vapor deposition or chemical vapor deposition (CVD), by plasma enhanced chemical vapor deposition (PECVD) or by wet chemical methods.

In process step (b), the functional element is preferably inserted between at least one first thermoplastic adhesive film and at least one second thermoplastic adhesive film. The functional element is preferably arranged as a pre-laminated functional element between a first and a second carrier film. The pre-laminated functional element is produced by arranging the first carrier film, the outer plate electrode, the active layer, the inner plate electrode, and the second carrier film laminarily one over another and by bonding them to one another under the action of heat, vacuum, and/or pressure.

The electrical contacting of the plate electrodes is preferably done before the bonding of the outer pane and the inner pane to form the composite pane or before the bonding of the carrier films to the functional element.

Process step (c) is preferably done under the action of heat, vacuum, and/or pressure. Methods known per se for producing a composite pane can be used, for example, autoclaving methods, vacuum bag methods, vacuum ring methods, calendering methods, vacuum laminators, or combinations thereof.

The composite pane according to the invention is preferably used in buildings, in particular in the access or window region or in means of transportation for travel on land, in the air, or on water, in particular in trains, ships, and motor vehicles, for example, as a rear window, side window, and/or roof panel.

The composite pane according to the invention can be bonded to another pane to form an insulating glazing unit.

The invention moreover includes the use of an infrared protective coating according to the invention, which contains at least three functional layers with reflecting properties in the infrared range, in a composite pane with electrically switchable optical properties for the protection of a switchable functional element against infrared radiation.

The invention is explained in detail with reference to drawings and exemplary embodiments. The drawings are schematic representations and are not true to scale. The drawings in no way restrict the invention. They depict.

Figure 1:
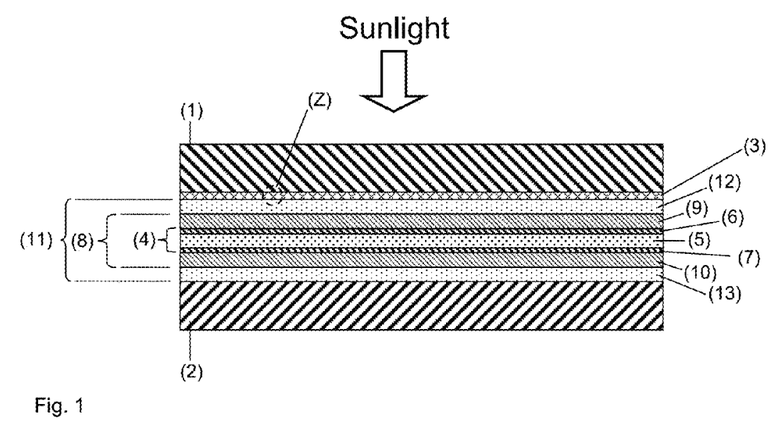
FIG. 1 a cross-section through a first embodiment of the composite pane according to the invention with electrically switchable optical properties,
FIG. 2 an enlarged view of the detail Z of FIG. 1,
FIG. 3 a cross-section through another embodiment of the composite pane according to the invention,
FIG. 4 a cross-section through another embodiment of the composite pane according to the invention,
FIG. 5 the transmittance of an infrared corrective coating according to the invention and according to the prior art using a diagram,
FIG. 6 an exemplary embodiment of the method according to the invention using a flowchart,
FIG. 7 another exemplary embodiment of the method according to the invention using a flowchart, and
FIG. 8 another exemplary embodiment of the method according to the invention using a flowchart.
Figure 2:
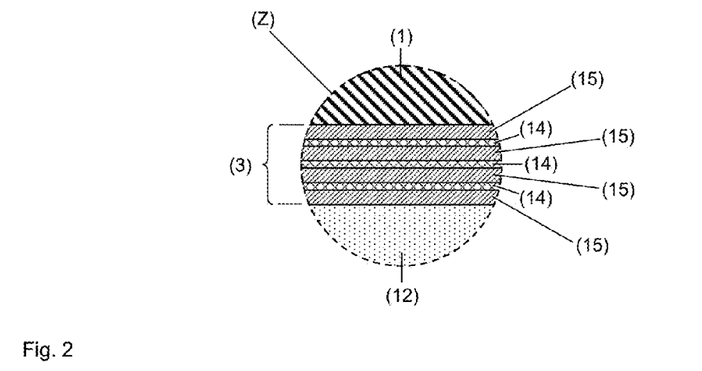

FIG. 1 and FIG. 2 each depict a detail of an embodiment of the composite pane according to the invention with electrically switchable optical properties. The composite pane includes an outer pane 1, which is bonded to an inner pane 2 via an intermediate layer 11. The composite pane is provided as a rear window of a motor vehicle and is arranged in the installed position such that the outer pane 1 faces the external environment and the inner pane 2 faces the motor vehicle interior. The outer pane 1 and the inner pane 2 are made of soda lime glass and have thicknesses of 1.6 mm.

A switchable functional element 4 is embedded in the intermediate layer 11. The functional element 4 is an SPD functional element with an active layer 5 between an outer plate electrode 6 and an inner plate electrode 7. The plate electrodes 6, 7 are connected to an external power supply via bus bars (not shown) and connection cables (not shown). The plate electrodes 6, 7 are made of indium tin oxide (ITO) and have a thickness of less than 1 µm. The active layer 5 contains polarized particles suspended in a resin. As a function of the voltage applied on the plate electrodes 6, 7, the suspended particles orient themselves along a common spatial direction. Through the orientation of the particles, the absorption of visible light is reduced. Consequently, the transmittance of visible light through the composite pane can be conveniently controlled electrically.

The functional element 4 was provided at the time of the production of the composite pane as a pre-laminated functional element 8. The pre-laminated functional element 8 comprises the functional element 4 between a first carrier film 9 and a second carrier film 10. The carrier films 9, 10 are made of polyethylene terephthalate (PET) and have a thickness of 0.125 mm.

The pre-laminated functional element 8 is bonded to the outer pane 1 via a first thermoplastic adhesive film 12 and to the inner pane 2 via a second thermoplastic adhesive film 13. The thermoplastic adhesive films 12, 13 are made of ethylene vinyl acetate (EVA) and have in each case a thickness of 0.38 mm. The intermediate layer 11 thus comprises the first thermoplastic adhesive film 12, the pre-laminated functional element 8 (with the first carrier film 9, the outer plate electrode 6, the active layer 5, the inner plate electrode 9, and the second carrier film 10), and the second thermoplastic adhesive film 13.

To prevent damage of the active layer 5 of the functional element 4 from infrared radiation, an infrared protective coating 3 is applied on the inside surface of the outer pane 1. The infrared radiation component of sunlight penetrating into the composite pane via the outer pane 1 is reflected by the infrared protective coating 3, before it can strike the active layer 5.

The infrared protective coating 3 comprises four dielectric layers 15 and three functional layers 14, which are applied alternatingly on the outer pane such that each functional layer 14 is arranged between two dielectric layers 15 and adjacent functional layers 14 are separated from one another in each case by a dielectric layer 15. The functional layers 14 are made of silver (with possible production-related impurities) and have, for example, a layer thickness of roughly 15 nm. The dielectric layers 15 contain, in the simplest embodiment, in each case a single layer of a dielectric material, for example, silicon nitride. Those single layers of a dielectric material that are arranged between two functional layers 14 have, for example, in each case a layer thickness of roughly 50 nm. The top and the bottom single layer of a dielectric material have, for example, in each case a layer thickness of 25 nm. However, the dielectric layers 15 can also contain in each case two or more single layers of different materials.

The infrared protective coating 3 according to the invention with the three functional layers 14 has high transmittance in the visible spectral range. In the infrared range, the infrared protective coating 3 has high reflectance and low transmittance. In particular, in the near infrared range, the reflectance is significantly improved compared to a known infrared protective coating with only one or two functional layers. Thus, the functional element 4 is significantly more effectively protected against aging.

After application on the outer pane 1, the infrared protective coating 3 was subjected to a temperature treatment. The outer pane 1 with the infrared protective coating 3 was heated, for example, to at least 300° C. In particular, the crystallinity of the functional layers 14 is improved by the temperature treatment. Thus, the transmittance of visible light and the reflecting properties relative to infrared radiation are significantly improved.

Figure 3:
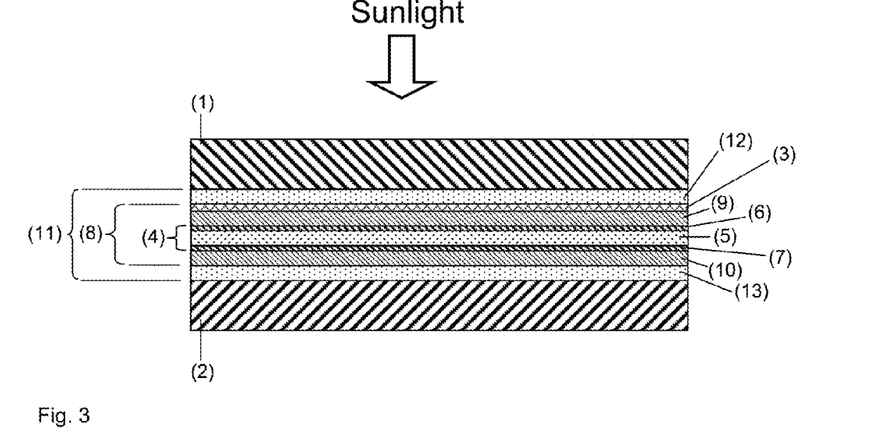

FIG. 3 depicts a cross-section through another embodiment of the composite pane according to the invention with electrically switchable optical properties. The outer pane 1, the inner pane 2, the thermoplastic adhesive films 12, 13, the carrier films 9, 10, and the functional element 4 are configured as in FIG. 1. The infrared protective coating 3 is applied on the surface of the first carrier film 9 facing away from the functional element 4 and thus arranged in the composite pane between the first thermoplastic adhesive film 12 and the first carrier film 9. With a thus positioned infrared protective coating 3, the aging of the active layer 5 can also be effectively prevented.

Alternatively, the infrared protective coating 3 can also be applied on the first thermoplastic adhesive film 12. It is, alternatively, also possible to apply the infrared protective coating 3 on another film which is inserted between the first thermoplastic adhesive film 12 and the carrier film 9 during production of the composite pane.

Figure 4:
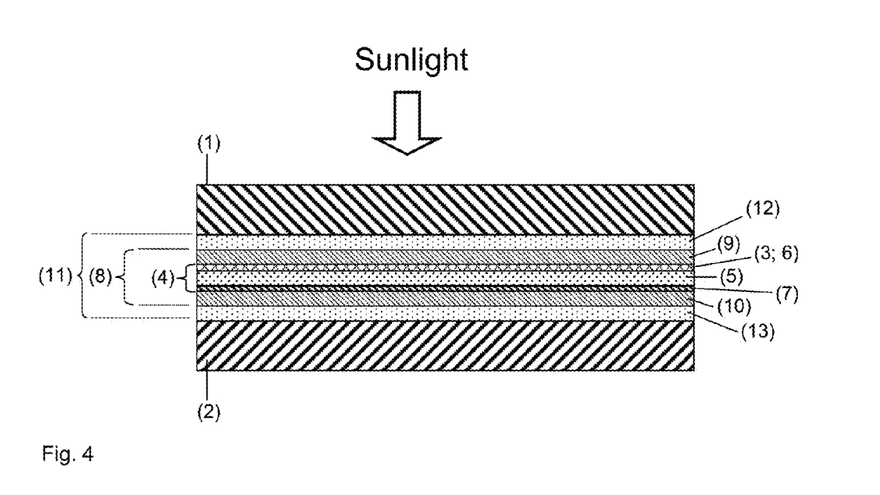

FIG. 4 depicts a cross-section through another embodiment of the composite pane according to the invention with electrically switchable optical properties. The infrared protective coating 3 is applied on the surface of the first carrier film 9 facing the active layer 5. The infrared protective coating 3, which is itself electrically conductive, serves simultaneously as the outer plate electrode 6. This simplifies the production of the composite pane. For this, the infrared protective coating 3 is connected to the external power supply via a bus bar and a connecting cable (not shown). In addition, the infrared protective coating 3 is advantageously protected against corrosion and other damage in the interior of the pre-laminated functional element 8. Consequently, the pre-laminated functional element 8 with the integrated infrared protective coating 3 can be prepared in relatively large quantities before the production of the composite pane.

Alternatively, of course, another layer made, for example, of indium tin oxide can be applied on the infrared protective coating 3 as the outer plate electrode 6.

Figure 5:
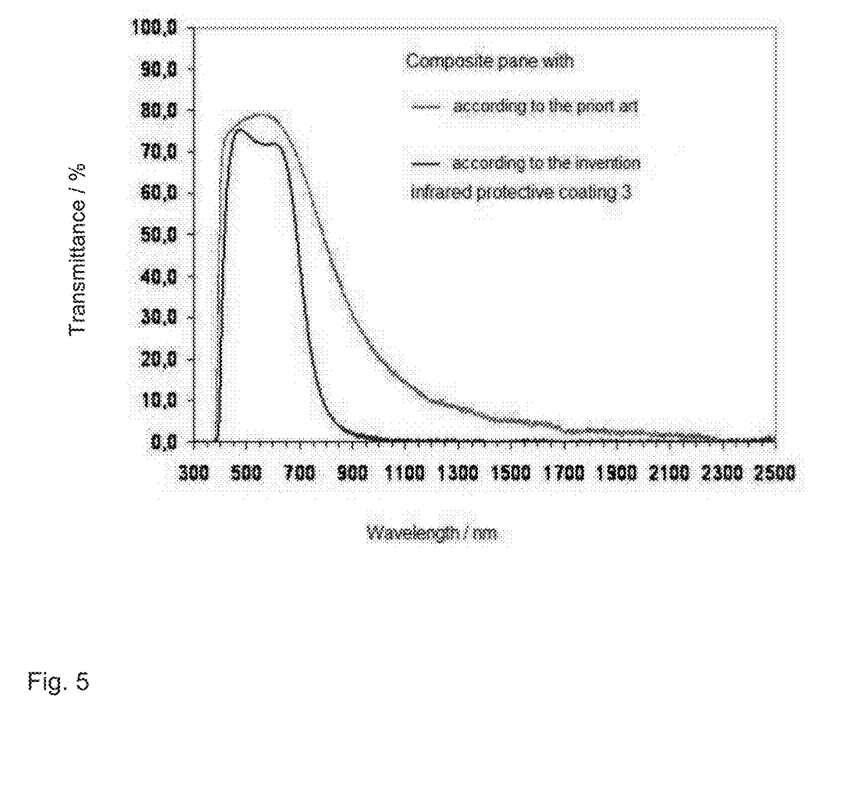

FIG. 5 depicts a diagram of the transmittance through a composite pane with an infrared protective coating 3 according to the invention. The infrared protective coating 3 was applied on the inner surface of the outer pane 1 and comprised three functional layers 14 made of silver. The infrared protective coating 3 was tempered. The diagram further depicts the transmittance through a composite pane with an infrared protective coating according to the prior art, which contained only two functional layers made of silver and which was applied on another thermoplastic film made of PET inserted in the intermediate layer. For better comparison of the transmittance is of the infrared protective coatings, the composite panes have no functional element 4. It is clearly discernible that the infrared protective coating 3 according to the invention has lower transmittance in the infrared radiation range, in particular even in the near infrared range. Consequently, a functional element 4 is better protected against aging due to infrared radiation by an infrared protective coating 3 according to the invention.

Figure 6:
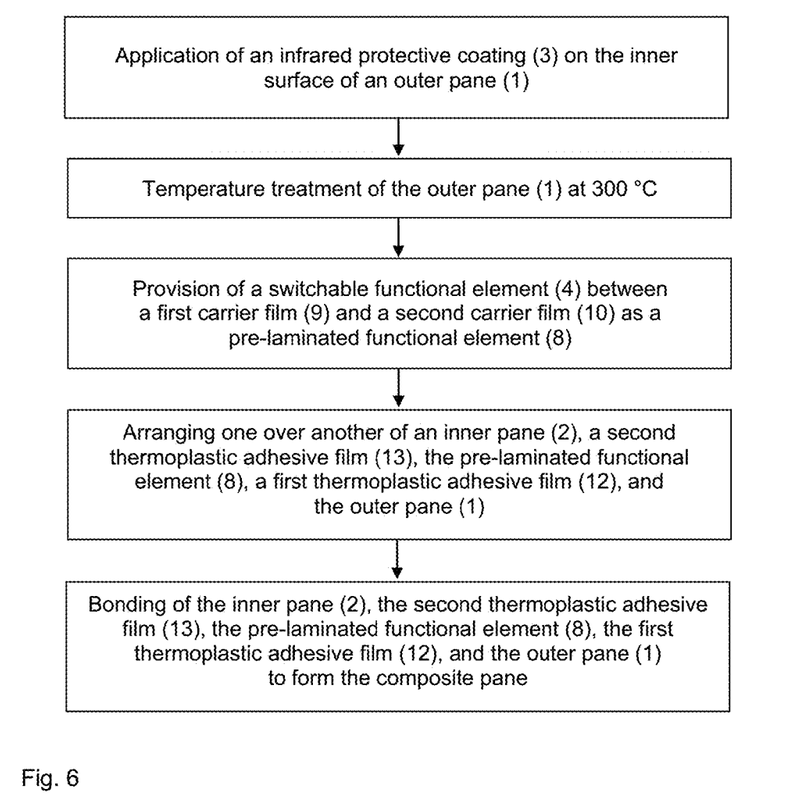

FIG. 6 depicts an exemplary embodiment of the method according to the invention for producing a composite pane with electrically switchable optical properties. The exemplary embodiment results in a composite pane according to the invention in accordance with FIG. 1. First, an infrared protective coating 3 is applied on the inner surface of the outer pane 1. Then, the coated outer pane 1 is subjected to a temperature treatment at 300° C. The switchable functional element 4 contains an active layer 5 between an outer plate electrode 6 and an inner plate electrode 7. The switchable functional element 4 is provided as a pre-laminated functional element 8 between a first carrier film 9 and a second carrier film 10. An inner pane 2, a second thermoplastic adhesive film 13, the pre-laminated functional element 8, a first thermoplastic adhesive film 12, and the outer pane 1 are arranged laminarily one over another in the order indicated and then laminated under the action of temperature, pressure, and/or vacuum to form the composite pane.

Figure 7:
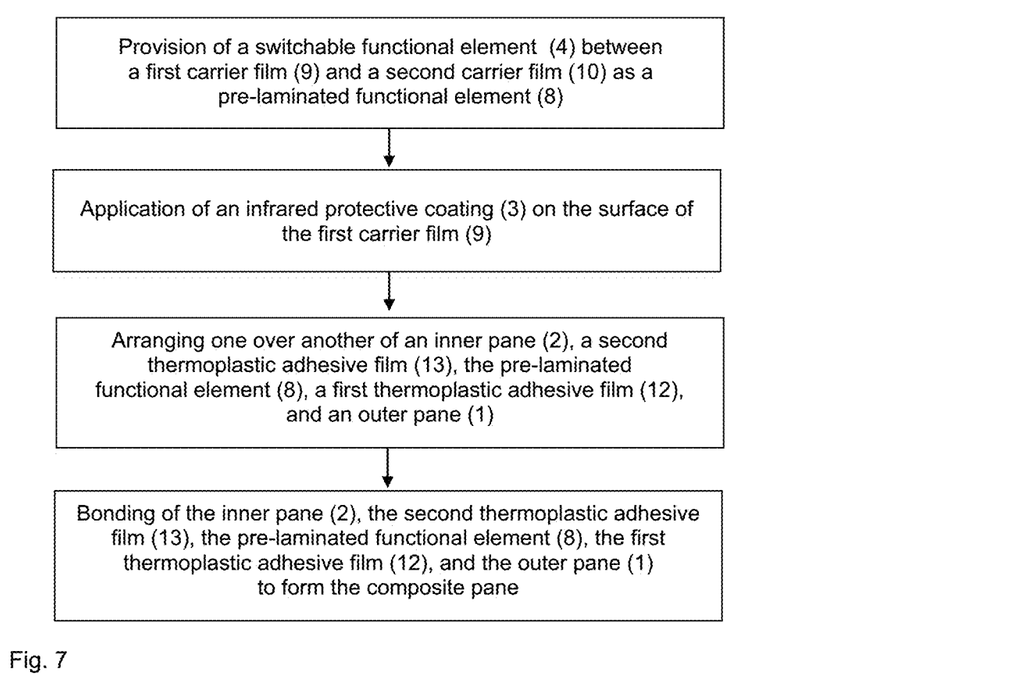

FIG. 7 depicts an exemplary embodiment of the method according to the invention for producing a composite pane with electrically switchable optical properties. The exemplary embodiment results in a composite pane according to the invention in accordance with FIG. 3. The switchable functional element 4 contains an active layer 5 between an outer plate electrode 6 and an inner plate electrode 7. The switchable functional element 4 is provided as pre-laminated functional element 8 between a first carrier film 9 and a second carrier film 10. An infrared protective coating 3 is applied on the surface of the first carrier film 9 facing away from the functional element 4. An inner pane 2, a second thermoplastic adhesive film 13, the pre-laminated functional element 8, a first thermoplastic adhesive film 12, and an outer pane 1 are arranged laminarily one over another in the order indicated and then laminated under the action of temperature, pressure, and/or vacuum to form the composite pane.

Figure 8:
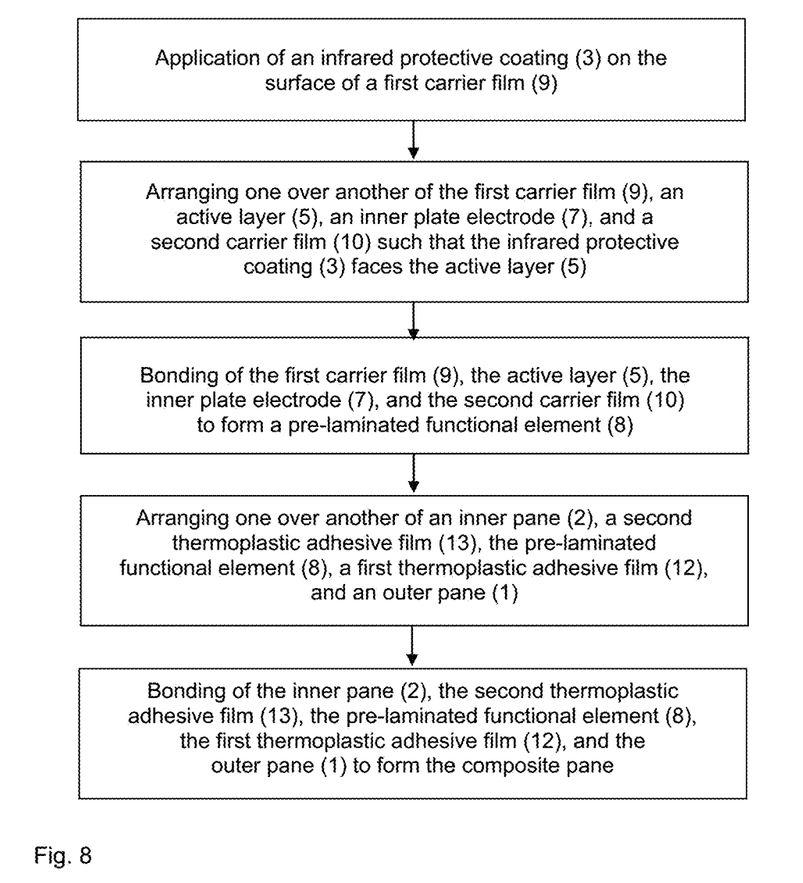

FIG. 8 depicts an exemplary embodiment of the method according to the invention for producing a composite pane with electrically switchable optical properties. The exemplary embodiment results in a composite pane according to the invention in accordance with FIG. 4. First, an infrared protective coating 3 is applied on the surface of a first carrier film 9. The first carrier film 9, an active layer 5, an inner plate electrode 7, and a second carrier film 10 are arranged laminarily one over another in the order indicated such that the infrared protective coating 3 faces the active layer 5. The infrared protective coating 3 serves as the outer plate electrode 6 and is appropriately contacted electrically for that purpose. The first carrier film 9 with the infrared protective coating 3, the active layer 5, the inner plate electrode 7, and the second carrier film 10 are bonded under the action of temperature, pressure, and/or vacuum to form a pre-laminated functional element 8. Next, an inner pane 2, a second thermoplastic adhesive film 13, the pre-laminated functional element 8, a second thermoplastic adhesive film 12, and an outer pane 1 are arranged laminarily one over another in the order indicated and then laminated under the action of temperature, pressure, and/or vacuum to form the composite pane.

EXAMPLE

A composite pane according to the invention with electrically switchable optical properties in accordance with FIG. 1 was produced. The infrared protective coating 3 was subjected, after application on the inner surface of the outer pane 1, to a temperature treatment. For this, the coated outer pane 1 was heated for 7 minutes to a temperature of 640° C. Then, the outer pane 1 with the infrared protective coating 3, the pre-laminated functional element 8, and the inner pane 2 were laminated via the first thermoplastic adhesive film 12 and the second thermoplastic adhesive film 13 at a temperature of roughly 120° C. and a pressure of roughly 2 bar to form the composite pane.

The composite pane was subjected to a standardized WeatherOmeter (WOM) Test. The composite pane was irradiated for 800 hours with a xenon arc lamp, whose radiation simulates the solar spectrum. The outer pane 1 was arranged facing the light source. After the irradiation, the value ΔE, which is presented in Table 1, was determined. The value ΔE indicates the changes in brightness and color of the composite pane due to the WOM Test. It is calculated using the following formula:

$$\Delta E = \sqrt{\left(\frac{\Delta L^*}{2}\right)^2 + \Delta a^{*2} + \Delta b^{*2}}$$

L* is the brightness value, a* and b* are the color coordinates in the L*a*b* Color Space. Δ refers to the difference of the respective variable before and after the WOM Test.

COMPARATIVE EXAMPLE 1

The Comparative Example 1 was performed exactly the same as the Example. The difference resided in the infrared protective coating 3. The infrared protective coating 3 comprised, according to the prior art, only two functional layers made of silver. The infrared protective coating 3 was also not applied on the outer pane 1, but, instead, on another thermoplastic film made of PET, which was inserted between the first thermoplastic adhesive layer 12 and the pre-laminated functional element 8 in the composite (Southwall XIR-75 PET). The composite pane was subjected to the same WOM Test. The value ΔE determined thereafter is presented in Table 1.

COMPARATIVE EXAMPLE 2

The Comparative Example 2 was performed exactly the same as the Example. However, in contrast to the Example, the composite pane had no infrared protective coating 3. The composite pane was subjected to the same WOM Test. The value ΔE determined thereafter is presented in Table 1.

TABLE 1

|  | Example | Comparative Example 1 | Comparative Example 2 |
|---|---|---|---|
| ΔE | 2.4 | 4.1 | 4.8 |

It can be discerned from Table 1 that the infrared protective coating 3 according to the invention results in substantially reduced aging of the functional element 4. The protection of the functional element 4 is substantially improved compared to a composite pane with an infrared protective coating according to the prior art. This result was unexpected and surprising for the person skilled in the art.

LIST OF REFERENCE CHARACTERS (1) outer pane
(2) inner pane
(3) infrared protective coating
(4) switchable functional element
(5) active layer of the functional element 4
(6) outer plate electrode of the functional element 4
(7) inner plate electrode of the functional element 4
(8) pre-laminated functional element
(9) first carrier film of the pre-laminated functional element 8
(10) second carrier film of the pre-laminated functional element 8
(11) intermediate layer
(12) first thermoplastic adhesive film
(13) second thermoplastic adhesive film
(14) functional layer with reflecting properties in the infrared range
(15) dielectric layer
Z detail of the composite pane

The invention claimed is:
1. A composite pane with electrically switchable optical properties, comprising:
   an outer pane and an inner pane, which are laminarily bonded to one another via an intermediate layer; and
   inside the intermediate layer, a prelaminated functional element including,
   a) a switchable functional element that contains,
      a1) at least one active layer,
      a2) an infrared protective coating that contains at least three functional layers with reflecting properties for the infrared range, the infrared protective coating being an outer plate electrode, and
      a3) and inner plate electrode,
   b) a first carrier film, and
   c) a second carrier film,
   wherein the infrared protective coating is laminarily arranged between the outer pane and the active layer,
   wherein the switchable functional element is laminarily arranged between the first carrier film and the second carrier film,
   wherein the first carrier film is bonded to the outer pane at least via one first thermoplastic adhesive film and the second carrier film is bonded to the inner pane via at least one second thermoplastic adhesive film, wherein the infrared protective coating is laminarily arranged on the surface of the first carrier film facing the at least one active layer, wherein the at least one active layer is laminarily arranged between the outer plate electrode and the inner plate electrode, wherein the prelaminated functional element is a previously prepared prelaminated functional element with integrated infrared protective coating, and wherein the composite pane has an edge region that is not provided with the infrared protective coating.

2. The composite pane according to claim 1, wherein the switchable functional element is a suspended particle device (SPD) functional element.

3. The composite pane according to claim 1, wherein the functional layers contain at least one metal.

4. The composite pane according to claim 1, wherein each functional layer has a thickness from 5 nm to 50 nm.

5. The composite pane according to claim 1, wherein each functional layer is arranged between two dielectric layers, which contain at least one oxide or one nitride.

6. The composite pane according to claim 1, wherein the outer pane and/or the inner pane contain non-prestressed, partially prestressed, or prestressed glass.

7. The composite pane according to claim 1, wherein the averaged transmittance of the infrared protective coating in the spectral range from 800 nm to 900 nm is less than or equal to 15%.

8. A method for producing the composite pane according to claim 1, the method comprising:
a) providing the previously prepared prelaminated functional element,
b) arranging the intermediate layer with the previously prepared prelaminated functional element laminarily between the outer pane and the inner pane, and
c) bonding the outer pane to the inner pane via the intermediate layer,
wherein the providing of the previously prepared prelaminated functional element includes applying the infrared protective coating on a surface of the first carrier film during preparing the previously prepared prelaminated functional element.

9. The method according to claim 8, wherein preparing the previously prepared prelaminated functional element further includes heating the infrared protective coating after the applying of the infrared protective coating to a temperature of at least 200° C.

10. The composite pane according to claim 3, wherein the functional layers contain silver.

11. The composite pane according to claim 4, wherein each functional layer has a thickness from 8 nm to 25 nm.

12. The composite pane according to claim 5, wherein each functional layer is arranged between two dielectric layers, which contain silicon nitride.

13. The composite pane according to claim 6, wherein the outer pane and/or the inner pane contain flat glass, float glass, quartz glass, borosilicate glass, soda lime glass, polyethylene, polypropylene, polycarbonate, polymethyl methacrylate, polystyrene, polyamide, polyester or polyvinyl chloride.

14. The composite pane according to claim 6, wherein the outer pane and/or the inner pane have a thickness from 0.5 mm to 15 mm.

15. The composite pane according to claim 6, wherein the outer pane and/or the inner pane have a thickness from 1 mm to 5 mm.

16. The composite pane according to claim 7, wherein the averaged transmittance of the infrared protective coating in the spectral range from 800 nm to 900 nm is less than or equal to 10%.

* * * * *